(12) United States Patent
Koike

(10) Patent No.: US 8,648,744 B2
(45) Date of Patent: Feb. 11, 2014

(54) OBJECT DETECTION APPARATUS

(75) Inventor: Shin Koike, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 534 days.

(21) Appl. No.: 12/593,314

(22) PCT Filed: May 29, 2008

(86) PCT No.: PCT/IB2008/001365
§ 371 (c)(1),
(2), (4) Date: Sep. 28, 2009

(87) PCT Pub. No.: WO2008/146145
PCT Pub. Date: Dec. 4, 2008

(65) Prior Publication Data
US 2010/0109937 A1    May 6, 2010

(30) Foreign Application Priority Data
May 30, 2007    (JP) ................................ 2007-144085

(51) Int. Cl.
*G01S 13/93* (2006.01)
*G01S 17/93* (2006.01)

(52) U.S. Cl.
USPC ......................................................... 342/70

(58) Field of Classification Search
USPC ......................................................... 342/70
See application file for complete search history.

(56) References Cited

U.S. PATENT DOCUMENTS

| | | | | |
|---|---|---|---|---|
| 4,308,536 A | * | 12/1981 | Sims et al. ....................... | 342/70 |
| 5,712,640 A | * | 1/1998 | Andou et al. .................... | 342/70 |
| 5,798,727 A | * | 8/1998 | Shirai et al. ..................... | 342/70 |
| 5,929,803 A | * | 7/1999 | Uehara et al. ................... | 342/70 |
| 6,125,191 A | | 9/2000 | Mashimo et al. | |
| 6,380,884 B1 | * | 4/2002 | Satou et al. ..................... | 342/70 |

(Continued)

FOREIGN PATENT DOCUMENTS

| DE | 101 48 064 A1 | 4/2003 |
|---|---|---|
| EP | 1 306 690 | 5/2003 |

(Continued)

OTHER PUBLICATIONS

Office Action issued Aug. 2, 2011, in Japanese Patent Application No. 2007-144085 with English translation.

(Continued)

*Primary Examiner* — Matthew M Barker
(74) *Attorney, Agent, or Firm* — Oblon, Spivak, McClelland, Maier & Neustadt, L.L.P.

(57) ABSTRACT

An object detection apparatus including: an electromagnetic wave radiating-receiver radiating an electromagnetic wave and receiving a reflection wave of the radiated electromagnetic wave; a reflection point identifying mechanism identifying, based on data regarding the reflection wave received by the electromagnetic wave radiating-receiver, a reflection point on a detection target object at which the radiated electromagnetic wave was reflected; and a representative point setting mechanism setting a representative point representing the position of the detection target object based on the reflection point identified by the reflection point identifying mechanism. The object detection apparatus outputs data regarding the set representative point. The representative point setting mechanism performs a correction prohibiting or minimizing a change of position of the representative point in the detection target object which occurs as a result of a change in a relative position between the detection target object and the moving body.

14 Claims, 7 Drawing Sheets

● : REFLECTION POINT
○ : REPRESENTATIVE POINT

(56) References Cited

U.S. PATENT DOCUMENTS

| | | | |
|---|---|---|---|
| 6,624,782 B2* | 9/2003 | Jocoy et al. | 342/70 |
| 6,888,622 B2* | 5/2005 | Shimomura | 356/4.01 |
| 7,224,309 B2* | 5/2007 | Shimomura | 342/70 |
| 7,274,436 B2* | 9/2007 | Matsuura et al. | 356/4.01 |
| 7,489,266 B2* | 2/2009 | Ohtake et al. | 342/70 |
| 2003/0142007 A1 | 7/2003 | Ono et al. | |

FOREIGN PATENT DOCUMENTS

| | | |
|---|---|---|
| JP | 9-159758 | 6/1997 |
| JP | 10-54875 | 2/1998 |
| JP | 10-62532 | 3/1998 |
| JP | 11-38139 | 2/1999 |
| JP | 11-231053 | 8/1999 |
| JP | 2000-121730 | 4/2000 |
| JP | 2000 206241 | 7/2000 |
| JP | 2004 205279 | 7/2004 |
| JP | 2005 308545 | 11/2005 |
| JP | 2006-258545 | 9/2006 |
| JP | 2006-349602 | 12/2006 |

OTHER PUBLICATIONS

English Translation of German Office Action issued Sep. 25, 2012, in German Patent Application No. 11 2008 000 797.7.

* cited by examiner

F I G . 1
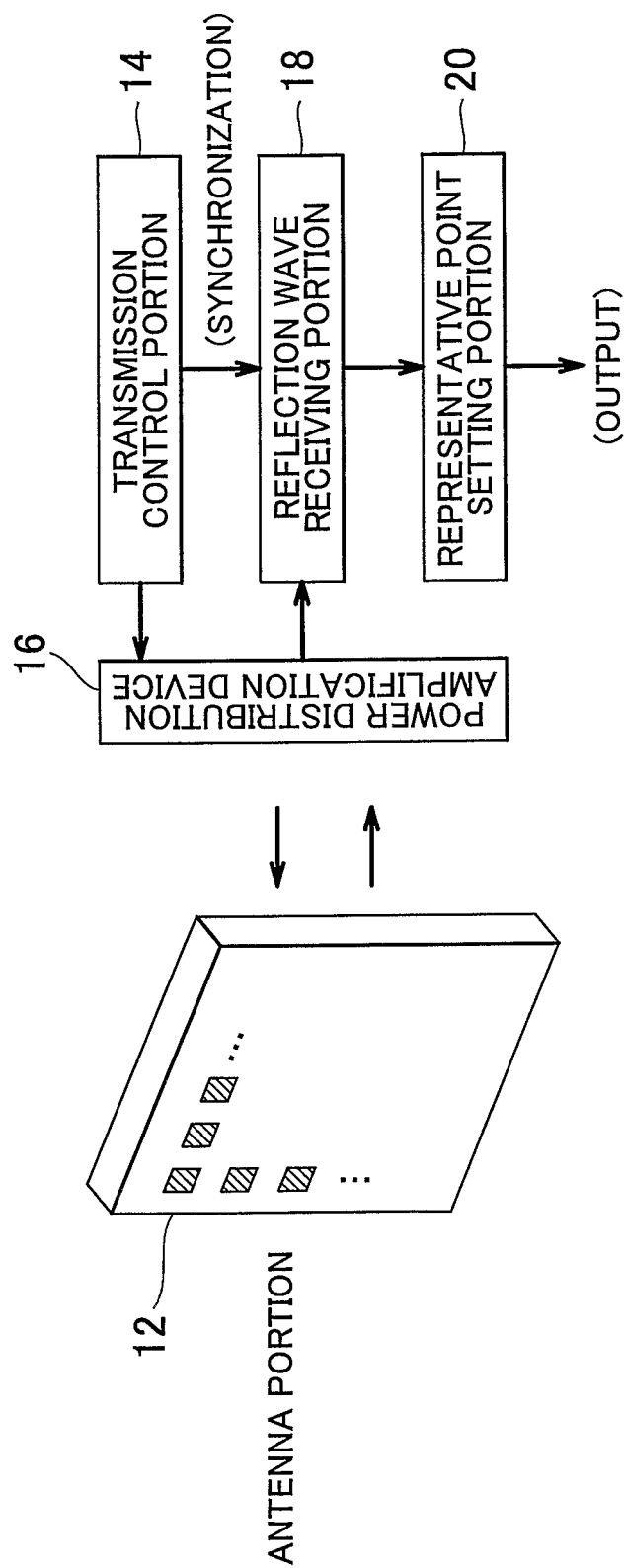

FRONT ←——→ REAR

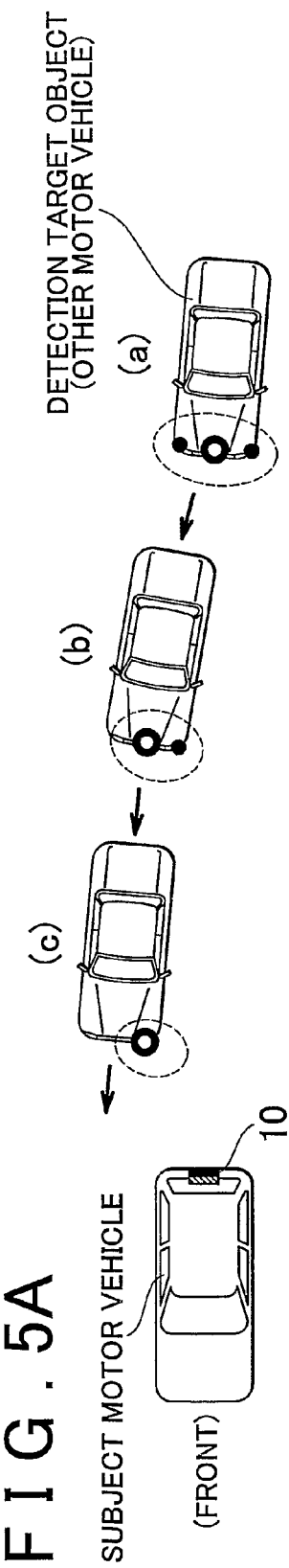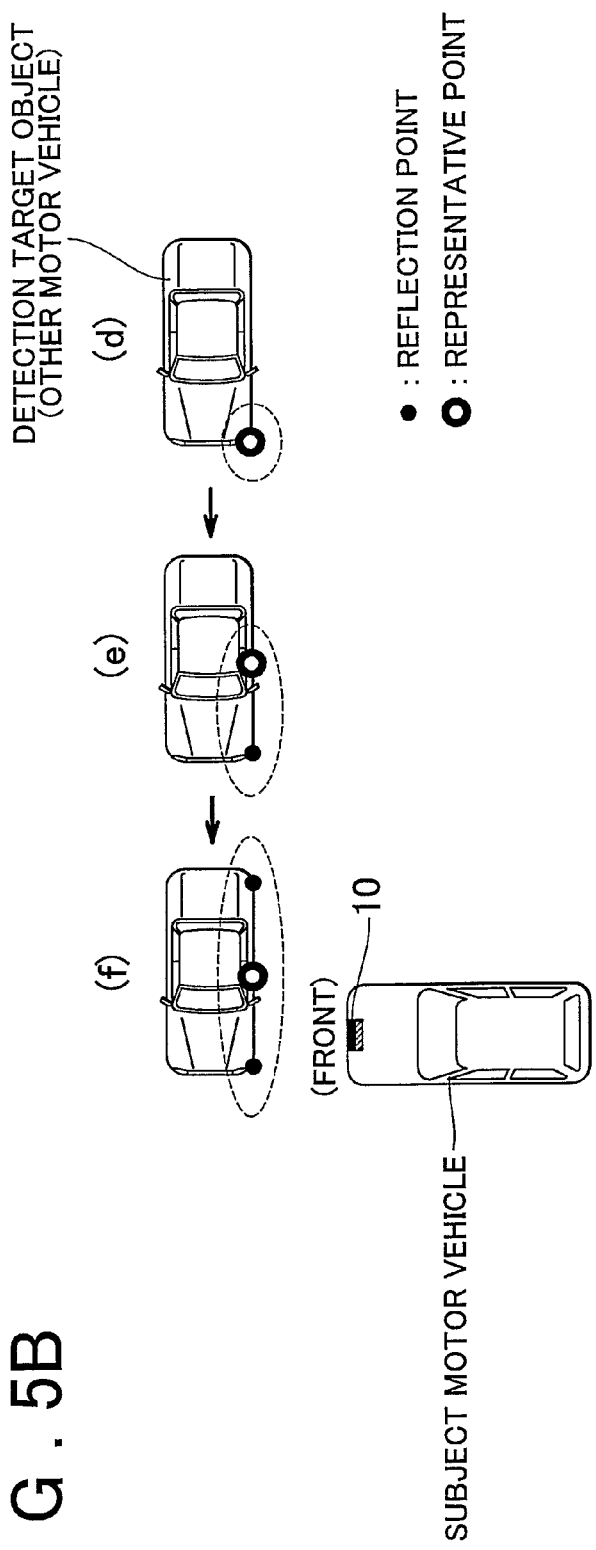
FIG. 5A
FIG. 5B

OBJECT DETECTION APPARATUS

BACKGROUND OF THE INVENTION

1. Field of the Invention

The invention relates to an object detection apparatus provided in a moving body and adapted to output information regarding the position of an object related to the moving body, and the like, which is used in various controls including collision prediction safety control and moving body-to-moving body distance control.

2. Description of the Related Art

A known radar device is provided in a moving body (e.g., a motor vehicle) to detect an object (e.g., other motor vehicle) around the moving body. The radar device calculates, from various information it detects, the distance between the moving body and the detection target object, the speed of the detection target object relative to the moving body, the azimuth of the detection target object from the moving body. Such a radar device is used in, for example, an adaptive cruise control system for maintaining a constant distance between the moving body and the preceding moving body, a pre-crush safety system for minimizing the impact to the moving body upon collision, and so on.

One such radar device is described in Japanese Patent Application Publication No. 2000-206241 (JP-A-2000-206241). According to this radar device, multiple beams are first radiated and the waves reflected from an object ("reflection waves") are then received, and the point from which each reflection wave has arrived ("reflection point") is determined. Then, one or more reflection point groups each consisting of the reflection points estimated to belong to the same object are created, and output information is then created based on the ordination of the respective reflection points in each group. JP-A-2000-206241 describes setting a representative point to the reflection point closest to the subject moving body (subject motor vehicle) among the grouped reflection points and then outputting the set representative point.

In view of the fact that radar devices of this kind are often used to predict a collision between the subject moving body and an object (i.e., to determine the possibility of such a collision), a certain degree of rationality is acknowledged in setting the representative point to the reflection point closest to the subject motor vehicle among the reflection points belonging to the same object.

However, the radar device described in JP-A-2000-206241 does not provide any measure against a phenomenon that the representative point changes as a result of a change in the relation between the detection target object and the subject motor vehicle. When this phenomenon occurs, for example, the representative point on an object may move as if the object is approaching the subject moving body despite the fact that it is not approaching the subject moving body, and this may lead to an erroneous determination that the subject motor vehicle is likely to collide with the object and also lead to a temporary decrease in the accuracy of a process for detecting the moving speed of the object.

SUMMARY OF THE INVENTION

The invention provides an object detection apparatus that contributes to achieving more accurate collision prediction.

One aspect of the invention relates to an object detection apparatus provided in a moving body and having: electromagnetic wave radiating-receiving means for radiating an electromagnetic wave and receiving a reflection wave of the radiated electromagnetic wave; reflection point identifying means for identifying, based on data regarding the reflection wave received by the electromagnetic wave radiating-receiving means, a reflection point on a detection target object at which the radiated electromagnetic wave was reflected; and representative point setting means for setting a representative point representing the position of the detection target object based on the reflection point identified by the reflection point identifying means, and the object detection apparatus is adapted to output data regarding the set representative point. The representative point setting means performs a correction for prohibiting or minimizing a change of the position of the representative point in the detection target object which occurs as a result of a change in a relative position between the detection target object and the moving body.

According to the object detection apparatus described above, because the representative point is set through the correction for prohibiting or minimizing a change of the position of the representative point on the detection target object resulting from a change in the relative position between the detection target object and the moving body, the accuracy in determining the relative movement of the detection target object further improves, and thus the accuracy in determining the possibility of collision with the detection target object improves accordingly.

The above-described object detection apparatus may be such that the representative point setting means corrects, when a reflection point has been newly identified by the reflection point identifying means as a result of the change in the relative position between the detection target object and the moving body, the representative point on the assumption that the newly identified reflection point does not exist while correcting, when one of reflection points identified by the reflection point identifying means has disappeared as a result of the change in the relative position between the detection target object and the moving body, the representative point on the assumption that the disappeared reflection point still exists.

Further, the above-described object detection apparatus may be such that the representative point setting means corrects, when one of reflection points identified by the reflection point identifying means has disappeared as a result of the change in the relative position between the detection target object and the moving body, the representative point on the assumption that the disappeared reflection point still exists.

Further, the above-described object detection apparatus may be such that the object detection apparatus is adapted to monitor a given area behind the moving body.

Further, the above-described object detection apparatus may be such that the representative point setting means corrects, when a reflection point has been newly identified by the reflection point identifying means as a result of a change in the relative position between the detection target object and the moving body, the representative point on the assumption that the newly identified reflection point does not exist.

Further, the above-described object detection apparatus may be such that the object detection apparatus is adapted to monitor a given area ahead of the moving body.

Further, the above-described object detection apparatus may be such that the representative point setting means selects one of reflection points identified by the reflection point identifying means using a given selection method and sets the representative point to the selected reflection point; and the representative point setting means prohibits or minimizes a change of the representative point from the selected reflection point to other reflection point which occurs as a result of the change in the relative position between the detection target object and the moving body.

Further, the above-described object detection apparatus may be such that the representative point setting means prohibits or minimizes a change of the position of the reflection point identified by the reflection point identifying means on the detection target object which occurs as a result of the change in the relative position between the detection target object and the moving body.

Further, the above-described object detection apparatus may be such that the representative point setting means estimates a movement amount of the reflection point as a result of the change in the relative position between the detection target object and the moving body, and prohibits or minimizes a change of the position of the reflection point from being changed, based on the estimated movement amount of the reflection point.

Further, the above-described object detection apparatus may be such that the representative point setting means performs the correction on the condition that the position of the representative point on the detection target object is likely to change as a result of the change in the relative position between the detection target object and the moving body.

Further, the above-described object detection apparatus may be such that the representative point setting means performs the correction on the condition that the detection target object is located in a predetermined region with respect to the moving body. Further, the above-described object detection apparatus may be such that the representative point setting means performs the correction on the condition that the azimuth of the detection target object from the moving body has shifted by a predetermined angle or larger, in other words, on the condition that the detection target object has been displaced by a predetermined distance or more in the lateral direction. The "lateral direction" represents the direction perpendicular to an imaginary straight line connecting the moving body and the detection target object.

Further, the above-described object detection apparatus may be such that the moving body is motor vehicle and the detection target object is other moving body.

As such, the object detection apparatus of the invention contributes to achieving more accurate collision prediction.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein:

FIG. 1 is a view schematically illustrating the overall configuration of an object detection apparatus of an example embodiment of the invention;

FIG. 5A and FIG. 5B are views each illustrating how the position of the representative point on the detection target object changes as a result of a change in the relative position between the detection target object and the subject motor vehicle;

DETAILED DESCRIPTION OF THE EMBODIMENTS

Figure 2:
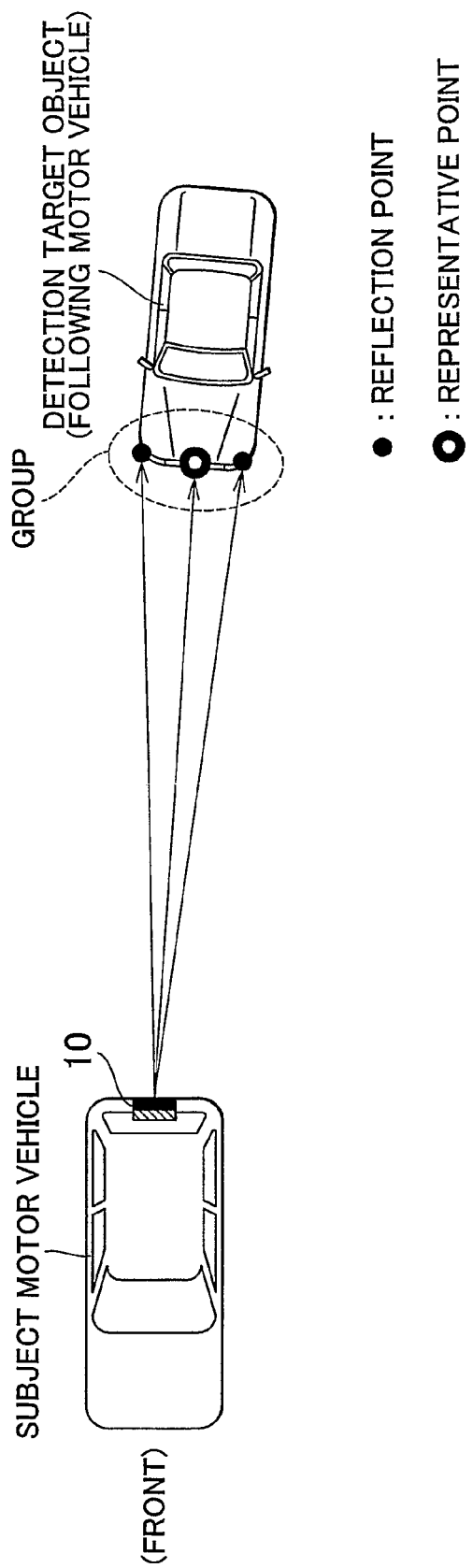
FIG. 2 is a view illustrating an example where the representative setting portion of the example embodiment of the invention sets the representative point to the reflection point closest to the subject motor vehicle among the grouped reflection points.

Hereinafter, example embodiments of the invention will be described with reference to the accompanying drawings.

First, an object detection apparatus according to an example embodiment of the invention will be described below.

FIG. 1 is a view schematically illustrating the overall configuration of an object detection apparatus 10 of the example embodiment of the invention. The object detection apparatus 10 is, for example, a millimeter-wave radar having, as its main components, an antenna portion 12, a transmission control portion 14, a power distribution amplification device 16, a reflection wave receiving portion 18, and a representative point setting portion 20.

The object detection apparatus 10 is arranged, for example, at the rear end of a motor vehicle to monitor a given area behind the motor vehicle (Refer to FIG. 2). It is to be noted that the invention is not specifically limited based on the arrangement of the object detection apparatus 10 nor on the monitoring area of the object detection apparatus 10. That is, if appropriate, the object detection apparatus 10 may be arranged at any other position and adapted to monitor, for example, a given area ahead of the motor vehicle, a given area diagonally ahead of the motor vehicle, a given area diagonally behind the motor vehicle, or a given area on either side of the motor vehicle.

The antenna portion 12 is, for example, an array antenna composed of a plurality of antenna elements. The transmission control portion 14 outputs transmission pulse signals to the power distribution amplification device 16 in given cycles. The power distribution amplification device 16 incorporates a circulator, a power distributor, a phase shifter, a power amplifier, and so on, and is adapted to amplify the received transmission pulse signals and then outputs them to the antenna portion 12. Receiving the transmission pulse signals, each antenna element of the antenna portion 12 radiates millimeter waves toward the aforementioned monitoring area.

Each millimeter wave reflected from a reflection point of an object (will hereinafter be referred to as "reflection wave") is received by the antenna portion 12. After received by the antenna portion 12, the reflection wave is input to the reflection wave receiving portion 18 via the power distribution amplification device 16. Then, the reflection wave receiving portion 18 determines the distance to the reflection point, the azimuth of the reflection point, and the relative speed of the reflection point by referring to the received reflection wave while synchronizing it with the signal output timing of the transmission control portion 14 (this process may be regarded as one example of the process recited by "identifying a reflection point" in the claims). More specifically, for example, the distance from the subject motor vehicle to the reflection point (more precisely, the distance from the radar device to the reflection point) is determined based on the time from when the millimeter wave was radiated to when its reflection wave was received, and the azimuth of the reflection point (the direction from which the reflection wave has arrived) is determined based on the phase difference between the signals received by the respective antenna elements of the antenna portion 12, and the speed of the reflection point relative to the subject motor vehicle is determined based on variation of the frequency of the reflection wave.

Note that the reflection wave receiving portion 18 may be adapted to identify two or more reflection points at the same time. However, if the reflection wave receiving portion 18 was adapted to identify all reflection waves including very weak reflection waves in all directions, there would be too many reflection waves to be identified. To avoid this, preferably, the reflection wave receiving portion 18 is adapted to identify only reflection waves the strength of which is larger than a threshold or to identify only reflection waves the strength of which largely varies as the azimuth of the corresponding reflection point changes. Further, the reflection wave receiving portion 18 may be adapted to identify only reflection points within a predetermined distance from the subject motor vehicle.

The reflection wave receiving portion 18 may be adapted to output the identified reflection points as they are. Alternatively, for the purpose of reducing the communication load and the computation load of systems using the output from the object detection apparatus 10, the reflection wave receiving portion 18 may be adapted to set a representative point representing the position of a detection target object and then output information regarding the set representative point (distance, azimuth, relative speed). To implement the latter, the object detection apparatus 10 of this example embodiment is provided with the representative point setting portion 20. While this example embodiment of the invention is described on the assumption that the detection target object is other motor vehicle, the detection target object is not necessarily other motor vehicle. That is, the detection target object can be any object.

The representative point setting portion 20 is, for example, a computer unit constituted of a CPU (Central Processing Unit), a ROM (Read Only Memory), a RAM (Random Access Memory), and so on, which are all connected to each other via a bus. Note that the transmission control portion 14 and the reflection wave receiving portion 18 may be provided as functions of the above computer unit. That is, the transmission control portion 14, the reflection wave receiving portion 18, and the representative point setting portion 20 may be entirely, or partially, integrated into a single computer unit.

In operation, the representative point setting portion 20 first groups, among the reflection points identified by the reflection wave receiving portion 18, the reflection points that are estimated to belong to the same object. The method for this grouping may be selected from among the following three methods (A), (B), and (C), for example. In the method (A), the reflection points located within a predetermined distance from each other are grouped. In the method (B), the reflection points moving on substantially the same path on an absolute coordinate are grouped. In the method (C), the reflection points located in a specific ordination corresponding to the reflection pattern of motor vehicles are grouped. In the method (B), for example, the direction in which each reflection point is moving on the absolute coordinate is determined at several time points, and the reflection points that are moving on substantially the same path are grouped. The moving direction of each reflection point on the absolute coordinate can be determined by, for example, correcting the distance from the position of the reflection point detected T (sec) ago to the position of the same reflection point detected the last time based on the distance that the subject motor vehicle has moved during the same time period. More specifically, if the moving distance from the position of the reflection point detected T (sec) ago to the position of the reflection point detected the last time is PT and the distance that the subject motor vehicle has moved from T (sec) ago to the present is VT (PT and VT are both a vector quantity), PT-VT represents the moving direction of the reflection point on the absolute coordinate which has been corrected based on the moving distance of the subject motor vehicle. In order to identify each reflection point as described above, data indicating the distance to each reflection point and the azimuth of each reflection point that are detected in the last several detection cycles may be stored in a memory such as the RAM (In each detection cycle, a millimeter wave is radiated and then said data is obtained from the reflection wave). The "reflection points moving on substantially on the same path" may be defined to be, for example, the reflection points located in a band-shaped region with a predetermined width and moving in directions within a particular angle range. Thus, if the moving directions (corrected moving directions) of two ore more of the reflection points have been determined to be substantially on the same path several times, they are then grouped.

Note that the invention is not specifically limited based on the above-described grouping process. For example, in the case where the directivity of the radar device is set so as to monitor a relatively narrow area, the representative point may be directly set based on the reflection points identified by the reflection wave receiving portion 18.

Next, a representative point representing the position of the detection target object is set for the grouped reflection points. At this time, for example, the representative point may be set to the reflection point closest to the subject motor vehicle among the grouped reflection points (Refer to FIG. 2). Alternatively, the representative point may be set to the reflection point corresponding to the gravity center among the grouped reflection points, or to the reflection point located at the center among the grouped reflection points (If the reflection point group consists of an even number of reflection points, the representative point may be set to the middle point between the two reflection points located at the center). Setting the representative point as mentioned above reduces the communication load for outputting the reflection point data from the reflection wave receiving portion 18 and the computation load of the systems that use the output from the reflection wave receiving portion 18.

After setting the representative point as descried above, the representative point setting portion 20 outputs its data including information regarding the distance from the subject motor vehicle to the representative point, the azimuth of the representative point from the subject motor vehicle, and the speed of the representative point relative to the subject motor vehicle. At this time, because the data of the reflection point set as the representative point has already been obtained, it may be output as the data of the representative point.

Figure 3:
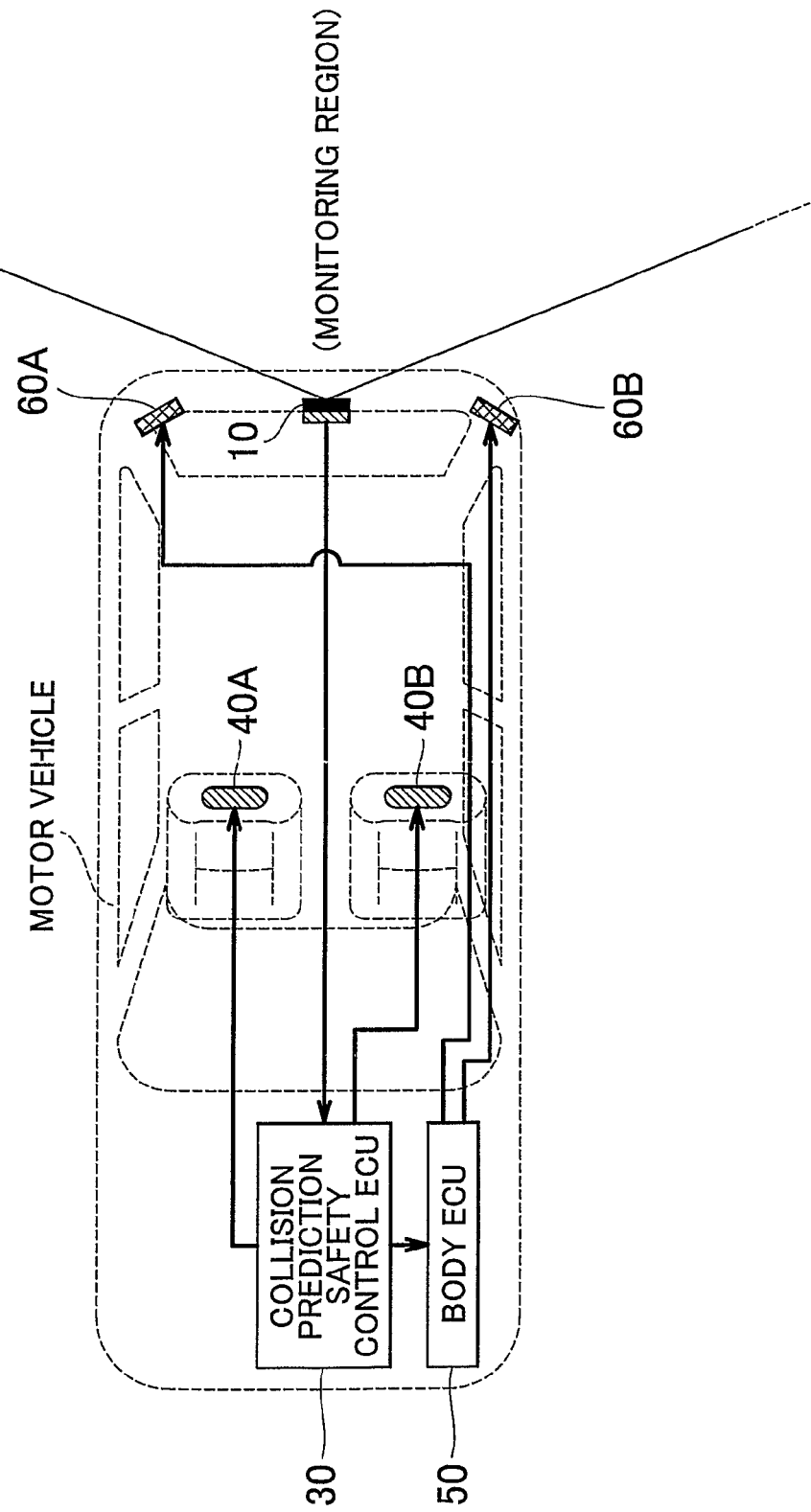
FIG. 3 is a view illustrating an example system that executes moving body control using the output from the object detection apparatus of the example embodiment of the invention.

FIG. 3 is a view illustrating an example system that executes moving body control using the output from the object detection apparatus 10 of the example embodiment of the invention. Referring to FIG. 3, the output of the object detection apparatus 10 is provided to a collision prediction safety control ECU (Electronic Control Unit) 30, and active headrest systems 40A, 40B, a body ECU 50, and hazard flashers 60A, 60B are activated by command signals from the collision prediction safety control ECU 30. The arrows in FIG. 3 indicate the main communication flows based on given communication protocols, such as CAN (Controller Area Network), BEAN, AVC-LAN, and FlexRay.

The collision prediction safety control ECU 30 determines the possibility of collision between the subject motor vehicle and the detection target object based on the representative point input from the object detection apparatus 10. More specifically, the collision prediction safety control ECU 30 determines that the detection target object is likely to collide with the subject motor vehicle if the distance from the representative point to the subject motor vehicle is equal to or lower than a predetermined distance and the representative point is approaching the subject motor vehicle at a relative speed equal to or higher than a predetermined speed. If it is determined that the detection target object is likely to collide with the subject motor vehicle, the collision prediction safety control ECU 30 provides the active headrests 40A, 40B with activation command signals and provides the body ECU 50 with signals for flashing the hazard flashers 60A, 60B.

Figure 4:
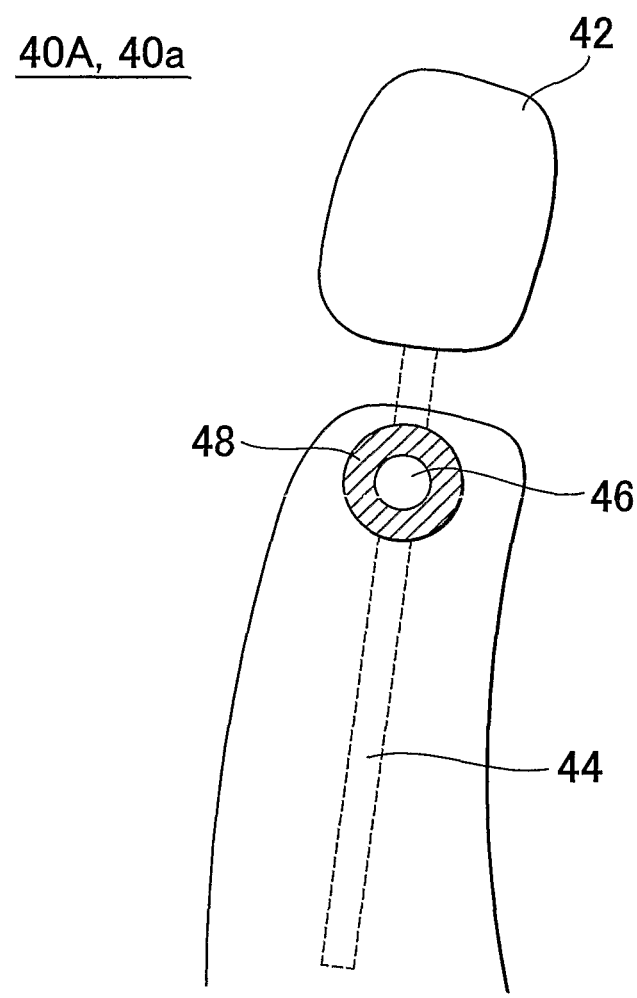
FIG. 4 is a view showing the structure of the active head rest of the example embodiment of the invention.

The active headrest systems 40A, 40B are provided at the driver's seat and the navigator's seat, respectively. The active headrest systems 40A, 40B are headrest mechanisms mainly provided for preventing whiplashes of the moving body occupants upon rear collision. More specifically, referring to FIG. 4, as a plate 42 in the seatback is pressed, a headrest 46 is moved forward about a fulcrum 44. In this example embodiment of the invention, a motor 48 is provided at the fulcrum 44, and the headrest 46 is moved forward by the motor 48 before the plate 42 is pressed, which further enhances the occupant safety. Further, because the hazard flashers 60A, 60B are made to flash to call attention of the driver of the motor vehicle running behind the subject motor vehicle, the driver can take an action to avoid the collision beforehand.

As mentioned earlier, the monitoring area of the object detection apparatus 10 is not limited to behind the subject motor vehicle. For example, in the case where the object detection apparatus 10 is adapted to monitor a given area ahead of the subject motor vehicle, when it is determined that a detection target object is likely to collide with the subject, motor vehicle, the object detection apparatus 10 outputs command signals for activating an automatic seatbelt winding mechanism and pre-crash airbag devices. Further, in the case where the object detection apparatus 10 is adapted to monitor given areas on the both sides of the subject motor vehicle or given areas diagonally ahead of the subject motor vehicle on the both sides thereof, when it is determined that a detection target object is likely to collide with the subject motor vehicle, the object detection apparatus 10 outputs command signals for activating pre-crash side airbag devices and controls the steering system of the motor vehicle to steer the motor vehicle automatically, and forcibly. As such, no matter how the monitoring area of the object detection apparatus 10 is directed, the collision prediction safety control is properly performed with each monitoring area of the object detection apparatus 10.

Figure 6:
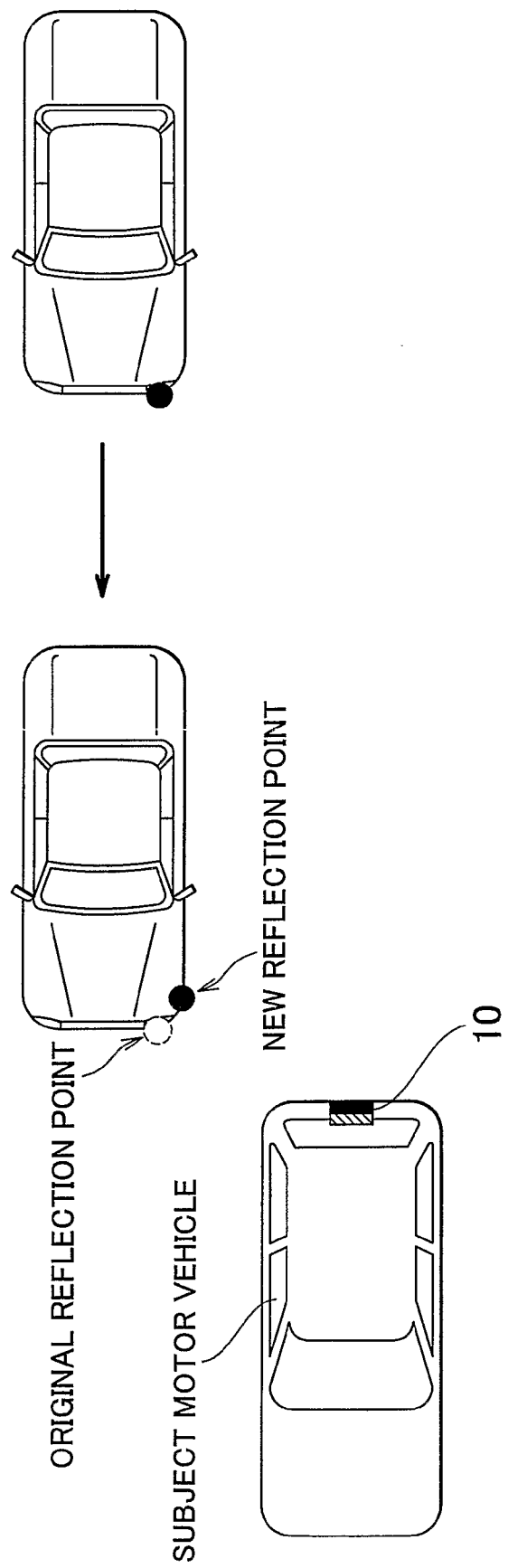
FIG. 6 is another view illustrating how the position of the representative point on the detection target object changes as a result of a change in the relative position between the detection target object and the subject motor vehicle.

However, in the case where the representative point is set in the manner described above, the position of the representative point in the detection target object may change as the relative position between the detection target object and the subject motor vehicle changes, and this may temporarily reduce the accuracy of the above-described collision possibility determination by the collision prediction safety control ECU 30. FIG. 5A, FIG. 5B and FIG. 6 illustrate one example of such a phenomenon. Note that the arrows in FIG. 5A, FIG. 5B and FIG. 6 represent the running paths of other motor vehicle.

FIG. 5A illustrates an example where the representative point representing other motor vehicle as a detection target object (will be referred to as "object motor vehicle") is set to the reflection point closest to the subject motor vehicle in a state where the object motor vehicle approaches from behind the subject motor vehicle and then passes through one side of the subject motor vehicle. Initially, the three reflection points at the front of the object motor vehicle are identified, and the representative point is set to the center reflection point among the three (Refer to the position (a) in FIG. 5A). Then, as the object motor vehicle approaches the subject motor vehicle (from the position (b) to the position (c) in FIG. 5A), the reflection points disappear one by one, and as a result, the representative point is changed to the reflection point on the left end of the object motor vehicle. As such, as the object motor vehicle moves from the position (b) to the position (c), the representative point shifts toward the subject motor vehicle, and this may cause the collision prediction safety control ECU 30 to erroneously determine that the object motor vehicle is likely to collide with the subject motor vehicle despite the fact that the object motor vehicle is moving away from the subject motor vehicle in the lateral direction of the subject motor vehicle.

Next, FIG. 5B illustrates an example where the object detection apparatus 10 is disposed at the front of the subject motor vehicle so as to monitor a given area ahead of the subject motor vehicle and the representative point setting portion 20 is adapted to set the representative point to the reflection point corresponding to the gravity center or to the reflection point located at the center. This example represents a state where the object motor vehicle approaches the subject motor vehicle from diagonally ahead of the subject motor vehicle and passes through the front side of the subject motor vehicle. In this example, initially (Refer to the position (d) in FIG. 5B), there is only one reflection point at the front end of one side of the object motor vehicle and therefore the representative point is set to this reflection pint. Then, as the object motor vehicle approaches the subject motor vehicle (from the position (e) to the position (f) in FIG. 5B), new reflection points appear one by one, so that the representative point is changed to the reflection point at the center of the side of the object motor vehicle when the object motor vehicle is at the position (e). As such, as the object motor vehicle moves from the position (d) to the position (e), the moving speed of the representative point temporarily decreases, and this may cause the collision prediction safety control ECU 30 to erroneously determine that the speed of the object motor vehicle has decreased despite the fact that it has not.

Next, FIG. 6 illustrates an example where the position of a reflection point on the object motor vehicle (detection target object) changes as the relative position between the subject motor vehicle and the object motor vehicle changes. Some objects that may become the detection target object (e.g., motor vehicles) have curved surfaces, or the like, and therefore the reflection points on such a curved object vary depending upon the direction from which the radar detection is performed. Therefore, in the example of FIG. 6, the position of the reflection point on the object motor vehicle changes as the relative position between the subject motor vehicle and the object motor vehicle changes. Thus, because the representative point is set based on reflection points, if the phenomenon illustrated in FIG. 6 occurs, the position of the representative point on the detection target object changes.

When such a phenomenon occurs, the accuracy of the above-described collision possibility determination by the collision prediction safety control ECU 30 decreases temporarily. If the accuracy of the collision possibility determination decreases, the aforementioned devices and systems for occupant protection may be activated by mistake when they do not need to be activated or they may fail to be activated when they need to be activated.

In view of the above, when setting a representative point, the object detection apparatus 10 of the example embodiment of the invention corrects the representative point so as to cancel a change of the position of the representative point on the detection target object resulting from a change in the relative position between the subject motor vehicle and the object motor vehicle (i.e., so as to prohibit such a change of the position of the representative point). The following are example methods of the correction. (α) If one or more of multiple reflection points on the detection target object have disappeared, the representative point is set based on the relative position between the reflection points before said reflection point or points disappeared. That is, in this case, the representative point is set on the assumption the disappeared reflection point or points still exist. (β) If a new reflection point has been additionally identified, the representative point is set based on the relative position between the reflection points before the new one was added. That is, in this case, the representative point is set on the assumption that the new reflection point does not exist. (γ) Even if the relative position between the reflection points changes, the representative point is prohibited from being changed from one reflection point to other reflection point as long as the number of the reflection points is unchanged. (δ) A change of the position of each reflection point on the detection target object resulting from a change in the relative position between the subject motor vehicle and the detection target object is cancelled. In the case (δ), for example, the relation between a change in the relative position between the detection target object and the subject motor vehicle and the amount that each reflection point would move as a result of said change in the relative position (the direction in which the each reflection point would move as a result of said change in the relative position) is determined in advance empirically, or by simulations, or the like. Based on the determined relation, a map or function that outputs the estimated movement amount (the estimated moving direction) of each reflection point corresponding to the change in the relative position between the detection target object and the subject motor vehicle may be formulated and stored in the ROM, or the like.

It is to be noted that all the correction methods (α), (β), (γ), (δ) described above are not necessarily executed. That is, only one of them may be selectively executed, or two or more of them may be selectively executed. Such selection of the correction methods may be based on the position and the monitoring area of the object detection apparatus 10, the manner of collision prediction safety control executed by systems that use the output of the object detection apparatus 10, and so on. For example, in the case where the object detection apparatus 10 is adapted to monitor a given area behind the subject motor vehicle, the necessity of the correction method (α) is high, and in the case where the object detection apparatus 10 is adapted to monitor a given area ahead of the subject motor vehicle, the necessity of the correction method (β) is high. As such, the correction methods may be selectively used as needed.

Owing to the correction mentioned above, the reprehensive point is set to a specific point on the detection target object and then maintained at the same point even if the relative position between the subject motor vehicle and the detection target object changes. That is, the representative point can be output as it is regardless of the change in the relative position between the subject motor vehicle and the detection target object. As such, the relative movement of the detection target object can be more accurately determined, improving the accuracy in determining the possibility of collision with the detection target object.

Meanwhile, in view of reducing the computation load, preferably, the representative point setting portion 20 is adapted to perform the above-described correction of the representative point on the condition that the position of the representative point on the detection target point is likely to change due to a change in the relative position between the detection target object and the subject motor vehicle, rather than performing it unconditionally.

For example, the representative point setting portion 20 may be adapted to perform the correction of the representative point on the condition that the detection target object is within a given region with respect to the subject motor vehicle, that is, on the condition that the distance between the subject motor vehicle and the detection target object is equal to or shorter than a predetermined distance. This is because the position of the representative point tends to change when the subject motor vehicle and the detection target object pass by each other at a small interval.

Further, the representative point setting portion 20 may be adapted to perform the correction of the representative point on the condition that the azimuth of the detection target object from the subject motor vehicle has changed by a predetermined angle or larger. This is because the position of the representative point on the detection target object tends not to change in a state where the detection target object is linearly approaching or linearly moving away from the subject motor vehicle. Thus, for the same purpose, the representative point setting portion 20 may alternatively be adapted to perform the correction of the representative point on the condition that the detection target object has been displaced by a predetermined distance or more in the lateral direction thereof (on the condition that the detection target object has been displaced in the direction perpendicular to an imaginary starlight line connecting the subject motor vehicle and the detection target object).

Figure 7:
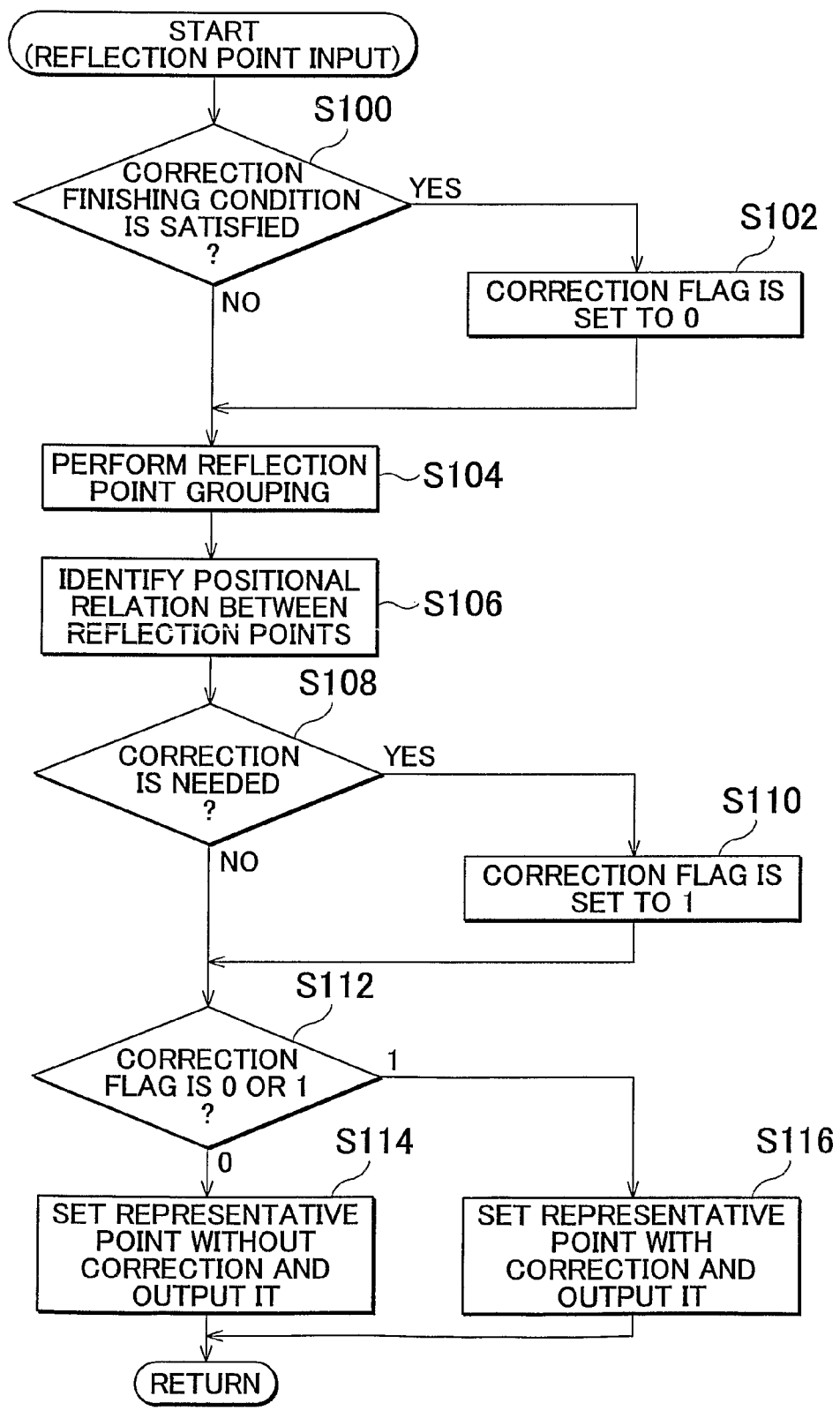
FIG. 7 is a flowchart representing a control routine executed by the representative point setting portion of the example embodiment of the invention.

The setting of the representative point including the above-described correction is performed as illustrated by the flowchart of FIG. 7, for example. FIG. 7 is a flowchart indicating the flow of a control routine executed by the representative point setting portion 20 as a feature thereof. This control routine is repeatedly executed as long as the reflection wave receiving portion 18 continues to input the aforementioned reflection point data to the representative point setting portion 20. Therefore, the control routine is finished when all the reflection points have disappeared.

In this control routine, the representative point setting portion 200 first determines whether a condition for finishing the correction of the representative point (will be referred to as "correction finishing condition") is presently satisfied (step 100). If so, the representative point setting portion 20 then sets a correction flag to 0 (step 102). The correction finishing condition is satisfied in the following case: a reflection point first disappears, and then, when a provisional reflection point is being set at the position at which said reflection point was, a new actual reflection point appears near the provisional reflection point. In short, this condition is satisfied when the disappeared reflection point has appeared again. On the contrary, the correction finishing condition may be regarded as being satisfied also in the following case. That is, a new reflection point appears, and the new reflection point then disappears while it is assumed that the new reflection point does not exist. The correction flag is a value input to a particular region of the RAM, or the like, and indicating whether it is necessary to correct the representative point (If the correction flag is 0, it indicates that the representative point does not need to be corrected. If the correction flag is 1, it indicates that the representative point needs to be corrected). The correction flag is initially set to 0 at the time of starting the motor vehicle or when all the reflection points have disappeared.

Subsequently, the representative point setting portion 20 performs the above-described grouping of the obtained reflection points (step 104) and identifies the relative positions among the reflection points grouped and records the identified relative positions in the RAM, or the like (step 106).

After the reflection point grouping and the relative position identification described above, the representative point setting portion 20 determines whether it is necessary to correct the representative point (step 108). More specifically, the representative point setting portion 20 determines that it is necessary to correct the representative point when a new reflection point or points have appeared, when one or more of the existing reflection points have disappeared, and when the position of a reflection point on the detection target object has changed. If it is necessary to correct the representative point, the correction flag is set to 1 (step 110).

Then, the representative point setting portion 20 determines whether the correction flag is 0 or 1 (step 112). If the correction flag is 0, the representative point setting portion 20 sets the representative point to the reflection point closest to the subject motor vehicle among the grouped reflection points, to the reflection point corresponding to the gravity center among the grouped reflection points, or to the reflection point located at the center among the grouped reflection points, after which the representative point setting portion 20 outputs the set representative point (step 114).

On the other hand, if the correction flag is 1, the representative point setting portion 20 performs the above-described correction of the representative point, setting the representative point using correction methods like those described above in connection with step 114 (step 116).

As is obvious to those skilled in the art, when only a selected one or more of the correction methods ($\alpha$), ($\beta$), ($\gamma$), and ($\delta$) are performed, the above-described control routine may be modified as needed.

According to the object detection apparatus 10 of the example embodiment, as such, because the representative point is set by being corrected so as to cancel a change of the position of the representative point on the detection target object resulting from a change in the relative position between the detection target object and the subject motor vehicle, the relative movement of the detection target object can be more accurately determined, which contributes to improving the accuracy of collision prediction.

While the example embodiment of the invention has been described above, the invention is not limited in any way be the example embodiment presented. That is, the invention is intended to cover various modifications and equivalent arrangements within the scope and sprit of the invention.

For example, while a millimeter radar device is used as the object detection apparatus 10 in the foregoing example embodiment, the object detection apparatus 10 may be selected from among various other radar devices as the main component of the system.

Further, while the collision prediction safety control ECU 30 is used in the foregoing example embodiment of the invention, various other ECUs may be incorporated to control the motor vehicle using the output of the object detection apparatus 10.

The invention may be applicable to the filed of automobile manufacturing, the field of automotive part manufacturing, and the like.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are example, other combinations and configurations, including more, less or only a single element, are also within the spirit and scope of the invention.

The invention claimed is:

1. An object detection apparatus provided in a moving body comprising:
   an electromagnetic wave radiating-receiving section that radiates an electromagnetic wave and receives a reflection wave of the radiated electromagnetic wave;
   a reflection point identifying section that identifies, based on data regarding the reflection wave received by the electromagnetic wave radiating-receiving section, one or more reflection points on a detection target object at which the radiated electromagnetic wave was reflected; and
   a representative point setting section that sets a representative point representing a position of the detection target object from the one or more reflection points identified by the reflection point identifying section, the object detection apparatus outputting data regarding the set representative point,
   wherein
   the representative point setting section is configured to update the set representative point based on changes in the identified one or more reflection points by the reflection point identifying section,
   the representative point setting section is configured to update the set representative point by performing a correction on the set representative point, the correction prohibiting or minimizing a change in a position of the set representative point on the detection target object occurring as a result of a change in a relative position between the detection target object and the moving body, and
   the representative point setting section performs the correction on the set representative point in accordance with the change in the relative position between the detection target object and the moving body,
   wherein the correction performed by the representative point setting section is performed by changing the set representative point from a first one of the one or more reflection points to a second one of the one or more reflection points in accordance with a change in a relative position between the detection target object and the moving body.

2. The object detection apparatus according to claim 1, wherein the representative point setting section is configured to correct, when one of the one or more reflection points identified by the reflection point identifying section has disappeared as a result of the change in the relative position between the detection target object and the moving body, the set representative point on the assumption that the disappeared the one or more reflection point still exists.

3. The object detection apparatus according to claim 2, wherein the object detection apparatus is configured to monitor a given area behind the moving body.

4. The object detection apparatus according to claim 2, wherein the representative point setting section is configured to correct, when a reflection point has been newly identified by the reflection point identifying section as a result of a change in the relative position between the detection target object and the moving body, the updated representative point on the assumption that the newly identified reflection point does not exist.

5. The object detection apparatus according to claim 1, wherein the representative point setting section is configured to correct, when a reflection point has been newly identified by the reflection point identifying section as a result of a change in the relative position between the detection target object and the moving body, the set representative point on the assumption that the newly identified reflection point does not exist.

6. The object detection apparatus according to claim 5, wherein the object detection apparatus is configured to monitor a given area ahead of the moving body.

7. The object detection apparatus according to claim 1, wherein:
   the representative point setting section is configured to select one of the one or more reflection points identified by the reflection point identifying section using a given selection method and is configured to set the representative point to the selected reflection point; and
   the representative point setting section is configured to prohibit or minimize a change of the representative point from the selected reflection point to another reflection point which is detected as a result of the change in the relative position between the detection target object and the moving body.

8. The object detection apparatus according to claim 1, wherein the representative point setting section is configured to prohibit or minimize a change of a position of at least one reflection point identified by the reflection point identifying section on the detection target object from being changed as a result of the change in the relative position between the detection target object and the moving body.

9. The object detection apparatus according to claim 8, wherein the representative point setting section is configured to estimate a movement amount of the at least one reflection point as a result of the change in the relative position between the detection target point and the moving body, and to prohibit or minimize a change of the position of the at least one reflection point from being changed, based on the estimated movement amount of the reflection point.

10. The object detection apparatus according to claim 1, wherein the representative point setting section is configured to perform the correction on the condition that a position of at least one representative point on the detection target object is likely to change as a result of the change in the relative position between the detection target object and the moving body.

11. The object detection apparatus according to claim 1, wherein the representative point setting section is configured to perform the correction on the condition that the detection target object is located in a predetermined region with respect to the moving body.

12. The object detection apparatus according to claim 1, wherein the representative point setting section is configured to perform the correction on the condition that the azimuth of the detection target object from the moving body has shifted by a predetermined angle or larger.

13. The object detection apparatus according to claim 1, wherein the representative point setting section is configured to perform the correction on the condition that the detection target object has been displaced by a predetermined distance or more in the direction perpendicular to an imaginary straight line connecting the moving body and the detection target object.

14. The object detection apparatus according to claim 1, wherein:
   the moving body is a motor vehicle; and
   the detection target object is another motor vehicle.

* * * * *